Patented Mar. 16, 1943

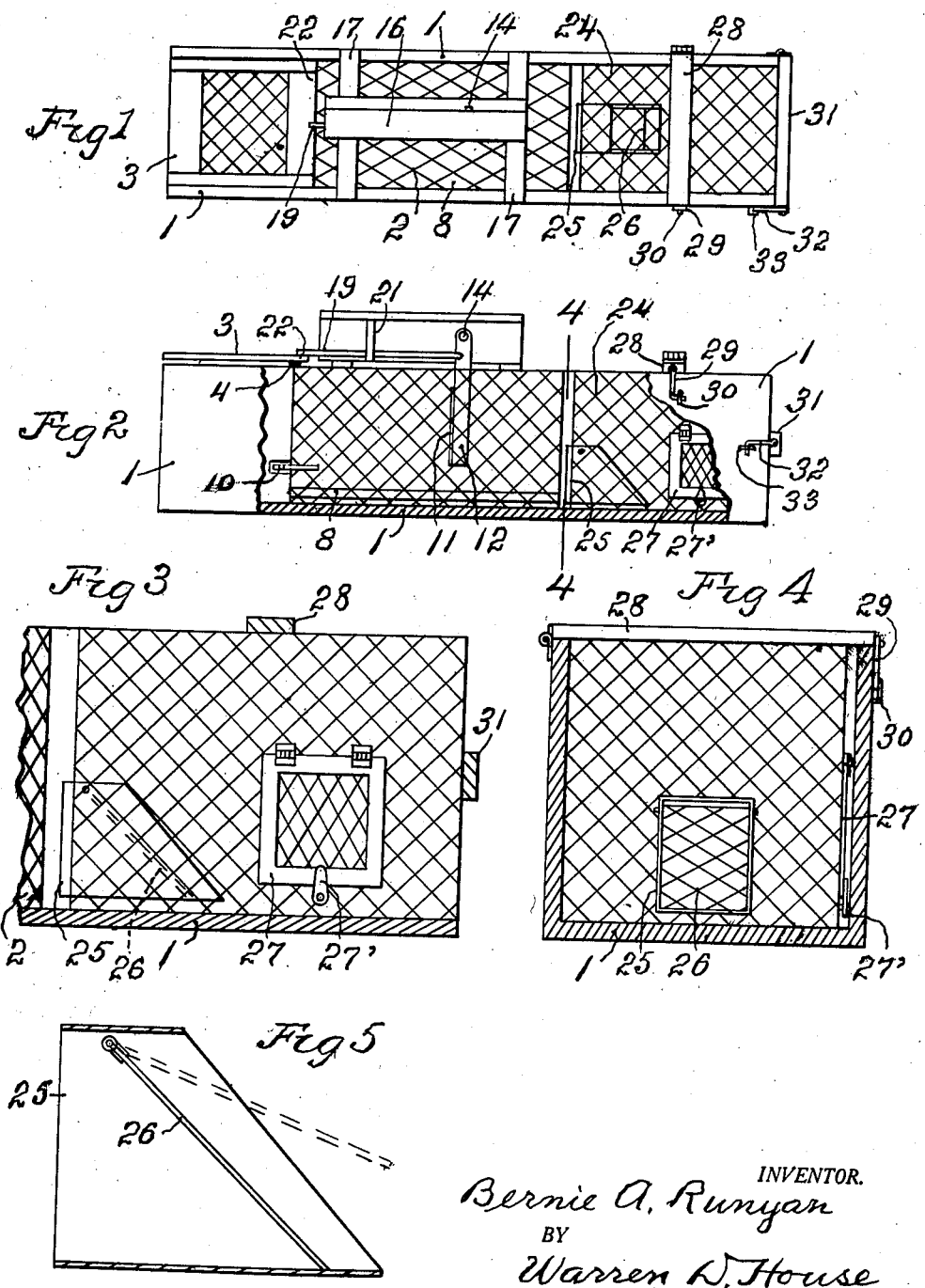

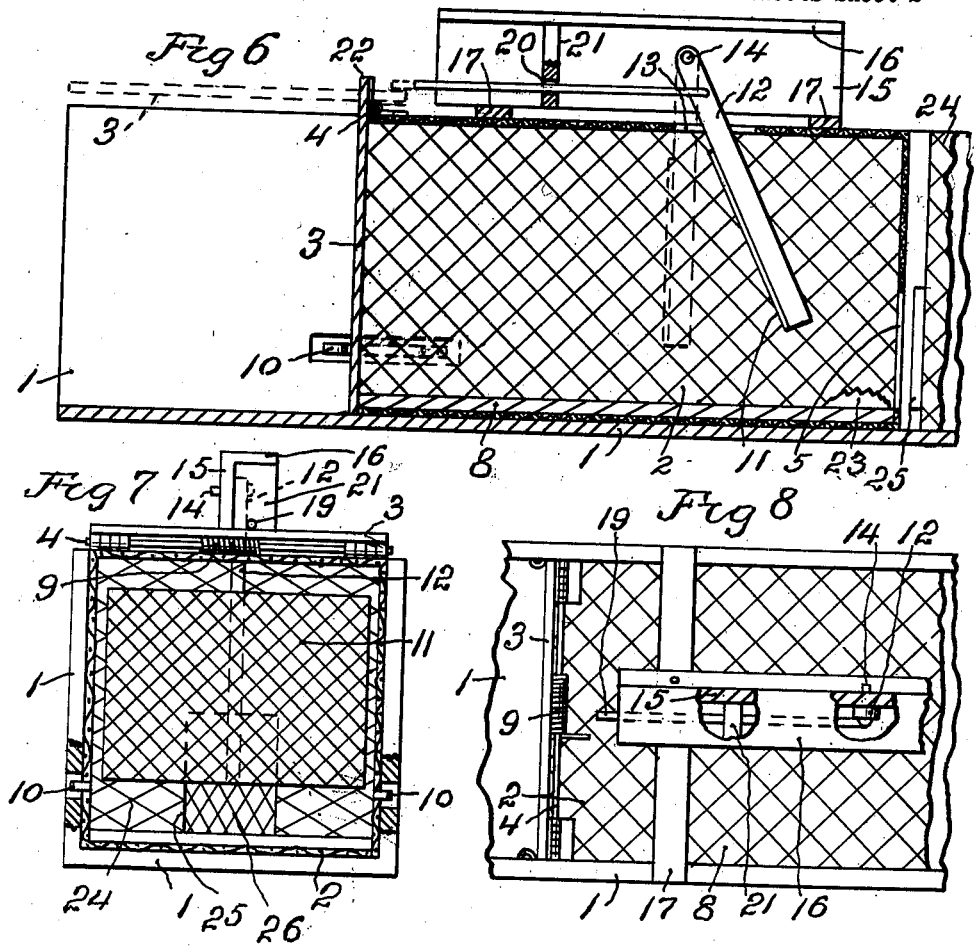

2,314,247

UNITED STATES PATENT OFFICE 2,314,247

ANIMAL TRAP

Bernie A. Runyan, Quenemo, Kans.

Application September 29, 1941, Serial No. 412,701

3 Claims. (Cl. 43—61)

My invention relates to improvements in animal traps. It is particularly well adapted for catching animals as large as rats.

One of the objects of my invention is to provide a trap of the kind described into which the animal to be caught will readily enter; which has a large entrance to be closed by a suspended door which swings outwardly and upwardly to the open position, the closing of which will not be interfered with by the animal entering the trap.

A further object of my invention, is the provision of novel means, actuated by the animal, after it has entered the trap, for releasably holding the door in its open position at the front of the entrance to be closed by it.

My invention provides further a front receiving compartment and a rear compartment communicating therewith, said compartments being disposed in a wooden channel casing, from which the rear compartment is removable, and in which the front end entrance of the front compartment is substantially spaced rearwardly from the front end of the wooden channel, whereby, when the animal enters the trap it does not have to walk or crawl on metal, which most animals are chary of doing.

A further object of my invention is the provision of a novel trap of the kind described, which is relatively simple and cheap to make, which is durable, and not likely to get out of order, and which is efficient in its operation.

The novel features of my invention are hereinafter fully described and claimed.

In the accompanying drawings, which illustrate the preferred embodiment of my invention, Fig. 1 is a plan view of the trap, showing the front entrance door of the receiving compartment in its forwardly extending open position.

Fig. 2 is a side view of what is shown in Fig. 1, partly in side elevation, partly broken away, and partly in vertical section.

Fig. 3 is an enlarged side view of a rear portion of the trap, the channel being shown in longitudinal vertical section, and the rear compartment shown in side elevation.

Fig. 4 is an enlarged sectional view on the line 4—4 of Fig. 2.

Fig. 5 is a further enlarged longitudinal vertical sectional view of the front entrance to the rear compartment, the self closing door therefor being shown in solid lines closed, and in dotted lines open.

Fig. 6 is an enlarged view of the front end portion of the trap, partly in longitudinal vertical section, and partly in side elevation and parts broken away, the entrance door being shown closed in solid lines, and shown open in dotted lines; the gate being shown open in solid lines, and closed in dotted lines.

Fig. 7 is an enlarged front end view of the trap, parts of the channel being broken away to disclose the catches for holding the front door closed, the front door being shown open, and the trigger gate shown closed.

Fig. 8 is an enlarged top view of a front end portion of the trap, showing the front door closed, parts being broken away.

Similar characters of reference designate similar parts in the different views.

1 designates a channel having an open top and ends, extending the length of the trap, having imperforate side walls and bottom, and preferably of non-metallic material, such as wood.

In the channel 1 is a receiving compartment 2, having foraminous sides, top, bottom and rear end, and preferably composed of wire mesh material.

The front end of the compartment 2 is open so as to form a large front entrance adapted to be closed by a door 3, hinged adjacent to its upper end to the top of the compartment 2 on a transverse axis 4 on which the door 2 may be swung outwardly and upwardly from the vertical closed position, shown in solid lines in Fig. 6, to the forwardly extending horizontal open position, shown in Figs. 1, 2 and 7, and in dotted lines in Fig. 6.

The rear end of the compartment 2, has an exit 5 which registers with a front entrance of another compartment, at the rear of and adjoining compartment 2, disposed removably in the channel 1 and having foraminous ends, top, sides and bottom, preferably of wire mesh material. Said other compartment will later be identified.

The front end of the compartment 2 is spaced rearwardly a substantial distance from the front end of the channel 1, and the door 3, when open extends between the sides of the channel 1 and over the bottom thereof. A wooden floor 8 is mounted removably on the bottom of the compartment 2, so that the animal to be caught has wood to walk on before and after entering compartment 2. Most animals are averse to walking on metal, but will willingly walk on wood.

A coil spring 9 encircling the axis 4 normally swings the door 3 to the vertical closed position. Two longitudinal spring catches 10 fastened to opposite walls of and projecting forwardly from the compartment 2 automatically engage and hold the door shut when it closes, Figs. 6 and 7.

For providing animal releasable means for holding the front door 3 open, the following described mechanism is provided.

A trigger gate 11, preferably of foraminous material, as wire mesh, extends transversely in the compartment 2 adjacent to the side walls thereof and spaced at substantial distances from the ends thereof, Figs. 6 and 7. The gate 11 has a stem 12 which extends upwardly through a longitudinal slot 13 in the top of the compartment 2.

The upper end of the stem 12 is pivoted on a transverse axis 14 to one side of the vertical flange 15 of a longitudinal right angled guard member having its other longitudinal horizontal flange 16 extending over the stem 12. The lower edge of the flange 15 is fastened to the upper sides of two cross bars 17, which rest at their ends upon the upper edges of the flanges of the channel 1.

Pivoted at its rear end on a transverse axis to the stem 12 below axis 14 is a member, comprising a rod 19, which extends forwardly and is slidable through a hole 20 in a transverse flange 21 provided integral with the flanges 15 and 16, Fig. 6.

When the gate 11 is vertical and the door 3 is in the open position, as shown in dotted lines in Fig. 6, the forward end of the rod 19 extends over and engages the upper side of a portion 22 of the door 3 which extends rearwardly from the axis 4 of the door, thus holding the door 3 from being swung by the spring 9 to the closed position.

The angled member 15—16 serves as guard means for preventing animals that get on top of the compartment 2 from releasing the door 3 from the holding rod 19.

In the compartment 2, at the rear of the gate 11, is placed bait 23. An animal entering the compartment 2, when the door 3 is open, to get the bait 23, can not get past the trigger gate 11, when the latter is in the vertical position, so will push the gate rearwardly, as shown in solid lines in Fig. 6, thereby withdrawing the rod 19 from engagement with the door 3, upon which the spring 9 will swing the door to its closed position, where it is engaged at opposite edges by the catches 10, which will hold it closed, and the animal will be held caged in the compartment 2 from which it can only escape through the exit 5. By having the trigger gate 11 of foraminous material, as wire mesh, the animal can detect the bait by sense of sight as well as smell, but is unable to get to it without swinging the gate so as to cause the door 3 to close.

To receive the animal passing through the exit 5, there is provided in the channel 1 at the rear of and adjacent to the compartment 2, a removable compartment 24, preferably composed at its top, bottom, and side and end walls of foraminous material, as wire mesh. The compartment 24 is provided at its front with an entrance 25, which registers with the exit 5, and is normally closed by a rearwardly inclined self closing door 26 pivoted at its upper end to the entrance 25.

The animal passing rearwardly through the exit 5 will enter the compartment 24 through the entrance 25, swinging the door 26 upwardly. After the animal has entered the compartment 24, the door 26 will swing by gravity downwardly to the closed position, thereby retaining the animal in the compartment 24.

For disposing of the animal held in the compartment 24, the latter may be removed from the channel 1 through the upper side or through the adjacent end of the channel. For removal of the animal from the compartment 24, the latter has at one side an outwardly opening door 27 closing a doorway through which the animal may be removed. The door 27 is normally held closed by the adjacent side of the channel. It also may be held closed by a catch 27', Fig. 2.

For holding the compartment 24 from accidental detachment from the channel 1, as during transportation, a cross bar 28 is hinged at one end to the outer side and upper edge of one wall of the channel 1, and can be swung to a position extending across the top of the compartment 24 and over the other wall of the channel to which it is secured by a latch 29 on the bar engaging a staple 30 on the outer side of said other wall, Figs. 1 and 2.

A transverse bar 31 is hinged to the adjacent end of one wall of the channel 1, and extends across the rear end of the compartment 24, and has at its free end a latch 32 which releasably engages a staple 33 on the outside of the other wall of the channel.

If desired, the door 27 and its doorway could be dispensed with and the animal caged in the compartment 24 removed therefrom by opening the door 26, after the compartment has been removed from the channel. The compartment 24 is removable, after the bars 28 and 31 have their latches 29 and 32 released from the staples 30 and 33.

By providing the compartment 2 with the foraminous rear end, the trigger gate 11, the door 26, and the ends of the compartment 24 of foraminous material, as wire mesh, the animal to be caught, can look endwise through the channel 1, so as to see its way as apparently clear to get the bait without peril. The tops of the compartments 2 and 24 also being foraminous also aid in convincing the animal that it will be safe for it to enter to obtain the bait.

Many modifications of my invention, within the scope of the appended claims, may be made without departing from my invention.

What I claim is:

1. In an animal trap, a compartment having at its front end an entrance opening, a door for closing said opening, means suspending said door on a horizontal transverse axis so it may be swung outwardly from a vertical closed position to a forwardly extending horizontal open position, a trigger gate in and extending transversely across said compartment, spaced from the ends thereof, and having a stem extending upwardly through the top of said compartment, longitudinal guard means on top of said compartment and to which said stem is pivoted on a horizontal transverse axis so that said gate may be swung rearwardly from a normal closed vertical position to an open position, a longitudinal member pivoted at its rear end to said stem below the axis thereof and under and slidably engaging said guard means, and having its front end portion disposed, when said gate is vertical, in a position in which it is adapted to engage and hold said door open, and movable by said stem rearwardly to disengage from said door when said gate swings rearwardly to the open position, and means for closing said door when released.

2. In an animal trap, a wooden channel, a compartment in said channel having a front end entrance opening spaced rearwardly from the front end of said channel, said compartment having a foraminous top and rear end, a door, means suspending said door on a horizontal transverse axis on which it may be swung outwardly from a vertical position closing said opening to a forwardly extending open position between the sides of said channel, a foraminous trigger gate extending across said compartment spaced from the ends thereof, means suspending said gate on a transverse axis so it may swing rearwardly from a normal vertical closed position to an open position, means actuated by said gate for holding said door open when said gate is vertical and which releases said door when said gate swings to the open position, and means for closing said door when released.

3. In an animal trap, a wooden channel, a compartment therein having a front end entrance spaced rearwardly from the front end of said channel, said compartment having a foraminous top and rear end, a door, means suspending said door on a transverse axis on which it may be swung outwardly and upwardly from a position closing said entrance to a forwardly extending open position in said channel, a foraminous trigger gate extending across said compartment, spaced from the ends thereof and having a stem extending upwardly through the top of said compartment, a longitudinal guard means on the top of said compartment to which said stem is pivoted on a transverse axis so said gate may be swung rearwardly from a normal vertical closed position to an open position, a longitudinal member pivoted at its rear end to said stem below the axis thereof and under and slidably engaging said guard means, and having means for engaging and holding said door open when said gate is vertical and disengaging from said door when said gate swings rearwardly to the open position, and means for closing said door when it is released.

BERNIE A. RUNYAN.